Figure 1:
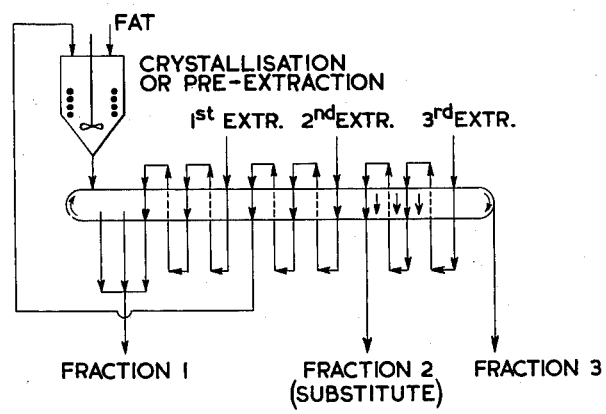

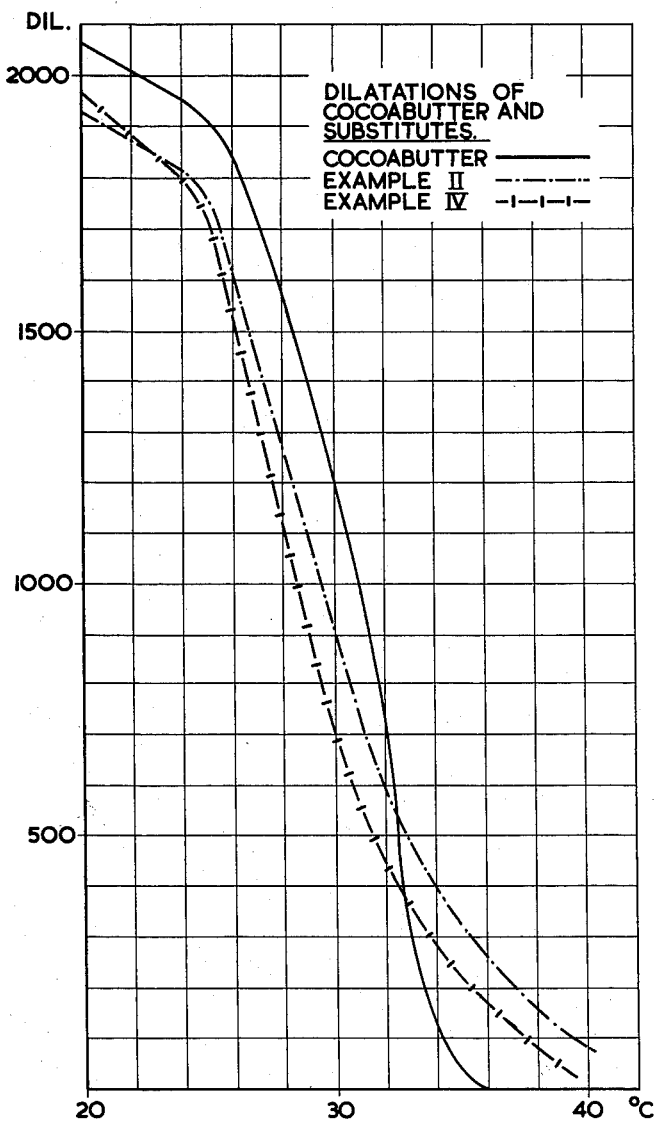

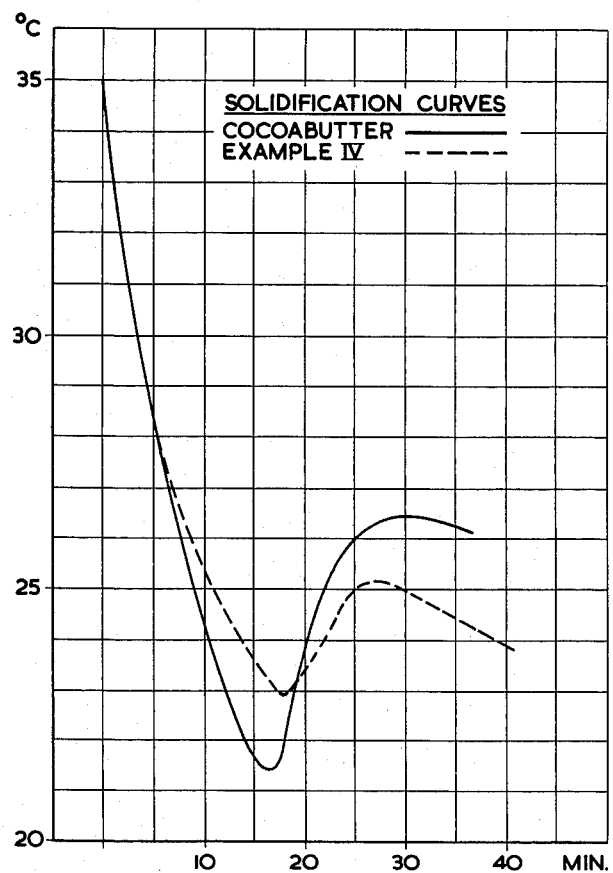

United States Patent Office 3,093,480
Patented June 11, 1963

3,093,480
PROCESS FOR THE PREPARATION OF
COCOA BUTTER SUBSTITUTES
Johannes M. Arnold, Zaandijk, Netherlands, assignor to
N.V. Twincon, Koog-Zaandijk, North Holland, Netherlands, a corporation of the Netherlands
Filed May 9, 1960, Ser. No. 27,850
Claims priority, application Netherlands May 13, 1959
10 Claims. (Cl. 99—118)

The invention relates to the preparation of cocoa butter substitutes and of products in which they are used.

Cocoa butter is used for a great many purposes; chief among these is its use in chocolate, although large quantities of cocoa butter are also employed in the pharmaceutical and the cosmetic industries.

Among naturally occurring fats cocoa butter occupies a special place because it is solid and fairly hard up to 25° C., has a short melting range, and is almost completely liquid at 35° C.

Because cocoa butter is an expensive product, it has long been replaced completely or partly by cheaper fats, while attempts are constantly being made to find improvements. A more recent solution of the problem of the substitution of cocoa butter is known from the Belgian patent specification No. 545,355; it describes a process starting from palm oil, from which at least 50% of a low-melting glyceride fraction is removed by cooling and crystallization. The solid fat can subsequently be dissolved again and a quantity of the high-melting fraction can be removed from it. The procedure in this fractionation is such that the fat is dissolved in a solvent and is induced to partial crystallization by cooling or evaporation of the solvent. According to the published German patent application No. 1,030,159 the initial material for the same purpose is lard, which is treated in the way described above. The published German patent application No. 1,030,160 takes tallow as initial fat and the published German patent application No. 1,030,668 palm oil.

The U.S. patent specification No. 2,678,937 describes a process for the removal of high-molecular saturated esters of fatty acids from oils and fats by dissolution in a solvent and cooling to a temperature at which the high-molecular esters crystallize. The material is kept at this temperature for some hours, then cooled to a temperature about 10° C. lower, and kept at this temperature again for at least 5 hours, upon which the crystals are separated from the solution. The process in question therefore is purely a crystallization.

Now it was found that an extraction method can be used with advantage for the preparation of a cocoa butter substitute. According to the invention a suitable fat or mixture of fats is brought in a solid or semi-solid extractable form by cooling, in the presence or absence of acetone and, if desired, in the presence of a carrier, upon which the material is extracted once or several times at the same or at increasing temperatures between $-5$ and $+10°$ C. with a total quantity of acetone twice to twenty times as great, calculated on the fat; the extract containing the low-melting fraction of the fat (fraction 1) is removed, the residue of the extraction(s) is extracted once or several times at the same or at increasing temperatures between 10 and 35° C. with a total quantity of acetone as great to fifteen times as great as the quantity of fat, and the cocoa butter substitute (fraction 2) is produced from this (these) extract(s), obtained between 10 and 35° C., by evaporation of the acetone, while the residue substantially consists of high-melting triglycerides (fraction 3).

According to the invention fats are thus separated into more than two fractions, one fraction being extracted as a solid fat from a solid fat.

It is advisable to divide the fat into small pieces before or during the extraction.

A suitable method is that of causing the extractions to proceed in stages, in which case the extract(s) of one or more stages is (are) used as extracting liquid(s) for the preceding extraction(s) or as solvent(s) for the fat or the mixture of fats.

Since the solubility of the more saturated compounds which are to be separated as crystals from the more unsaturated compounds is greater when more unsaturated compounds are present in the solvent (see Hilditch, The Chemical Constitution of Natural Fats, 1949, p. 521), the application of several stages has the great advantage that the greater part of the more unsaturated compounds can be removed at low temperature(s), i.e. with low solubility of the more saturated compounds. The complete removal of the more unsaturated compounds can take place at higher temperature(s), since then the concentration of these compounds in the solvent is lower, and accordingly the solubility of the more saturated glycerides is lower. In this way a sharper separation of the fractions is ensured.

It is possible to prepare the three fractions in question by continuous extractions, preferably in several stages, in counter-current, said extractions preferably being carried out on a horizontal filter, on which the fat is brought in an extractable form and from which the residue (fraction 3) is removed at the end of the last extraction.

The new process has considerable advantages over the known methods:

(1) From the point of view of heat economy it is superior to the crystallization method, where the desired cocoa butter substitute is obtained by repeated dissolution of the fat or the fat crystals in a large quantity of solvent. In this case heating to 45° C., for instance, is required. After this, the solution has to be cooled again. Thus a large quantity of solvent constantly has to be heated and cooled again. The fat, too, is constantly melted and crystallized, which requires heat.

(2) The extraction removes occluded lower-melting components from the crystals, which is not the case with crystallization and washing.

These so-called occlusions are known to occur in crystallizations. In view of this the high-melting fraction is purer with extraction. If the same degree of purity is to be attained with crystallization, it is necessary either to crystallize very slowly or to re-crystallize. In both cases this involves extension of the equipment.

(3) The extraction on a filter presents advantages over crystallization if unsaponifiable constituents are present in the fat, since the latter are more easily removed in the case of extraction. In the crystallization of the fat the constituents in question get into the crystalline fraction. With extraction on a filter, no stirring takes place and the permeability of the unsaponifiable constituents is greater (the filter resistance smaller) than with repeated dissolution, stirring, and crystallization. After these treatments it is more difficult or even impossible to filter these constituents.

(4) A great advantage of the extraction method is that it can easily be carried out continuously. Continuous extraction on a horizontal extractor (see FIG. 1), for instance, is realized more readily than a series of continuous crystallizations followed by filtrations.

(5) The continuous extraction yields a more constant product and can very easily be controlled automatically.

It is known in the literature (see e.g. Hilditch, The Chemical Constitution of Natural Fats, 1949, p. 520) that with crystallizations more or less considerable supersaturation and irregular adjustment of the equilibrium occur, resulting in fluctuations in the yield and the composition of the separated fractions. The mother liquors of the crystallizations are also liable to these fluctuations and tend to have an adverse effect on the process if they are used again. This is aggravated even further by the fact that the concentration of the more unsaturated compounds in the solvent affects the solubility of the more saturated compounds (see Hilditch, p. 521).

This results in fluctuations in the yield and the quality of the desired product, so that, if such variations are to be kept as small as possible, intensive supervision and repeated interference in the process will be necessary.

Properly speaking, the crystallization temperatures will have to be adapted to the degree of supersaturation and the composition of the mother liquors, which in practice is not possible.

The extraction process does not know these difficulties. There is no question of difficulty proceeding crystallizations affecting one another. The yield of the first extraction(s) for the removal of the oil fraction is constant and a constant product is passed on to the subsequent extractions.

According to the process of the invention it is possible to obtain from fats and mixtures of fats a fraction which can be used as a cocoa butter substitute and which is suitable in particular for the chocolate industry. Suitable initial products are palm oil, Shea butter, Borneo tallow, fat from the seed of Pentadesma butyracea, tallow and lard as well as mixtures thereof. A suitable cocoa butter substitute can also be obtained by mixing fractions individually obtained by extraction of these fats.

If palm oil is started from, this substance, which may or may not be mixed with other fats, is brought in an extractable form. This is done by cooling the oil, which may or may not have been pre-cooled and pre-crystallized, on a surface, by allowing the oil, which may or may not have been pre-cooled with stirring, to solidify on a carrier, or by bringing the oil in the crystalline form by crystallization from acetone. In the last-mentioned case it is preferred in virtue of the above considerations to use as little acetone as possible.

The fat in solid or semi-solid condition is extracted with acetone which may have a temperature which may be equal to or lower or higher than that of the fat. The extractions preferably take place in stages. The fraction first separated is an oily fraction forming preferably more than 50% of the palm oil, with an iodine value greater than 50, obtained by extracting in one stage or preferably in several stages at temperatures from $-5°$ to $+10°$ C. After this, by extraction to e.g. 35°, preferably in several stages, a fraction is obtained with an iodine value between 30 and 40 and a dilatation at 20° C. of more than 1200. The residue of the extractions is a product with an iodine value preferably less than 10.

By varying the temperature, the duration, and the number of the extractions it is possible to obtain a middle fraction which is more or less similar to cocoa butter, which will be explained with reference to a number of examples given below. Two graphs (FIGS. 2 and 3) are also annexed, in which dilatations and cooling curves are given for comparison with cocoa butter curves. The dilatations were determined after a standardized stabilization of the fat according to the D.G.F. Einheitsmethoden C–IV 3e (57).

*Example I*

By immersion in palm oil of 50° C. a thin layer of 2 to 3 mm. was applied on a 1-litre roundbottom flask cooled with a mixture of ice and salt. The palm oil was cooled once more by placing the flask for 15 minutes in an icebox at $-15°$ C.

After having solidified and set, the palm oil could easily be removed from the flask with a knife and was extracted several times with 500 cc. of acetone according to the scheme given below. After each extraction the flakes and crystals were filtered off on a Büchner funnel and washed each time with 100 cc. of acetone having a temperature equal to the extraction temperature. The quantity of fat which was extracted amounted to 115 g.

| Extraction temperature, °C | Yield of the fat extract after evaporation of acetone | Iodine value |
|---|---|---|
| 2 | 46.5 g.} =53.26% | 72.2} 69.9 |
| 7 | 14.7 g.} | 62.6} |
| 22 | 42.4 g.=36.90% | 37.0 |
| Residue | 11.3 g.=9.83% | 7.4 |

*Example II*

200 g. of palm oil with an iodine value of 50.8 and containing 4.8% of free fatty acids, calculated as palmitic acid, were slowly cooled to 10° C. with stirring.

The thick paste of crystals was applied as a thin film on the round outer surface of a number of 1-litre roundbottom flasks and cooled further to 2° C. The hard film of fat was scraped off with a knife, as a result of which approximately 2 mm. thick flakes were obtained.

65 g. of these flakes were extracted with acetone at 2°, 5°, and 7° C., the material being slowly stirred during the extractions. After each extraction the flakes and crystals (liberated in the extraction) were allowed to settle for 15 minutes and the liquid was siphoned off. The fractions were combined to a liquid from which, after evaporation of the acetone, 41 g. of oil (i.e. 63.1%) with an iodine value of 64.6 were obtained.

The flakes were subsequently extracted at 22°, 25°, 28°, and 30° C. After evaporation of the acetone, the combined extracts yielded 18.83 g. of fat (i.e. 29.0% of the palm oil) with an iodine value of 32.5 and a dilatation at 20° C. of 1935 (FIG. 2). The remainder of the crystals, after evaporation of the extracting agent, amounted to 4.97 g. (=7.64%) and had an iodine value of 4.5.

*Example III*

Crude palm oil was cooled to 15° C. with stirring and subsequently brought in the form of flakes by cooling with brine of $-1°$ C. on a cooling drum.

200 g. of these flakes were subjected to a series of extractions at 2 and 30° C. After being stirred and extracted, the flakes were filtered on a Büchner funnel and washed. The quantity started from was 200 g. (of flakes). At 2° C. the extraction was performed four times, the total quantity of extracting agent and washing liquor used being 1550 cc.

The filtrate collected contained 114.5 g.=57.25% of oil with an iodine value of 68.0.

In order to obtain the substitute fraction the solid material was extracted for one hour with 200 cc. of acetone at 30° C., filtered, and washed with 15 cc., followed by a second extraction at 30° C. with 100 cc. and washing with 15 cc. The total quantity of acetone used was 330 cc.

After evaporation, a substitute fraction of 67.7 g.=33.85%, with an iodine value of 33.7, was obtained.

The residue amounted to 16.2 g.=8.1%, with an iodine value of 5.8.

*Example IV*

8 kg. of crude palm oil was warmed with 38 l. of acetone mother liquor (the 7° C. extraction of an earlier experiment) to 40° C. and subsequently crystallized to 2° C. with stirring.

After cooling of the clear liquid the crystals were extracted three times for 20 minutes with 8 l. of acetone of 2° C. After each extraction the material was allowed to settle for 15 minutes, upon which the clear liquids were siphoned off. The combined liquids contained 4848 g. of oil=60.8% of the palm oil, with an iodine value of 65.8.

After this, the extraction was performed four times with a total quantity of 37 l. of acetone at 7° C. Each extraction lasted 20 minutes. The combined liquids form the mother liquor, in which palm oil can again be dissolved for the next experiment.

Now three extractions took place at 30° C., with a total duration of 135 minutes, and with 47 l. of acetone. From the liquids siphoned off, 2292 g.=28.0% of substitute were obtained, with an iodine value of 32.3 and a dilatation at 20° C. of 1930 and at 30° C. of 900 (FIG. 2). FIG. 3 shows the solidification curves of the substitute and of cocoa butter.

After evaporation, the residue consisted of 663 g. of fat=8.3%, with an iodine value of 8.7.

*Example V*

5 kg. of palm oil (iodine value=52.2, percentage of free fatty acids 4.3) were crystallized from 15.75 l. of mother liquor (6° C. extraction of a preceding experiment) to —1.5° C., after which the material was stirred for 45 minutes at this temperature.

The crystals were filtered off on a large Büchner funnel and washed with 5 l. of acetone of —1.5° C. Layer of crystals 4 cm., vacuum 120 mm. Hg. The crystals were subsequently returned to the crystallizer and extracted at 2° C. for 30 minutes with 6.5 l. of acetone with stirring, after which they were filtered off again on the Büchner funnel and washed once more with 5 l. of acetone of 2° C.

From the combined filtrates and wash liquors, 2978 g. of oil (59.56%) with an iodine value of 66.8 were obtained.

The crystals were subsequently extracted with 10 l. of acetone at 6° C. for 45 minutes. After being filtered off on the Büchner funnel, they were washed with 5 l. of acetone of 6° C. Filtrate and wash liquor form the liquor from which a new charge of palm oil can be crystallized.

After the crystals had been removed from the filter, they were extracted for 45 minutes with 7.5 l. of fresh acetone and 2 l. of wash liquor M₂ (see below) at 30° C.

After filtration, the crystals were washed once with 1.25 l. of fresh acetone of 30° C., the wash liquor being added to the extract of 30° C. The crystals were then washed again with 2 l. of acetone, which was kept as M₂ for a subsequent experiment.

From the extract, 1607 g.=32.14% of substitute were obtained, with an iodine value of 32.8 and a dilatation at 20° C. of 1940. After evaporation of the solvent the residue on the filter amounted to 386 g.=7.72%, with an iodine value of 7.1

*Example VI*

200 g. of palm oil were crystallized from 600 cc. of acetone at —2° C. The crystals were filtered off on a cooled Büchner funnel at —2° C. and washed with 200 cc. of acetone of —2° C. Thickness of the layer of crystals about 3 cm. The crystals filtered very well at a pressure difference of 10 to 12 mm. Hg.

The crystals were subsequently extracted five times with the same 250 cc. of acetone on the Büchner funnel at 2° C. The filtrate was kept at 2° C. and was constantly distributed over the crystals again.

The crystals were then washed with 200 cc. of acetone. Subsequently they were extracted five times with the same 425 cc. of acetone at 6.5° C. at a pressure difference of 22 mm. Hg. and washed once more with 200 cc. of acetone of 6.5° C. Filtrate and wash liquor 6.5° C. form the liquid from which 200 g. of palm oil can again be crystallized.

Without being removed from the filter, the crystals were now extracted five times again with the same 375 cc. of acetone of 30° C. The extraction took place at a pressure difference of 120 mm. Hg. The crystals were washed once more with 50 cc. of acetone of 30° C. From the extract 57.4 g. of substitute was obtained, with an iodine value of 32.2 and a dilatation at 20° of 1835. The remainder (top) on the filter, after evaporation of the solvent, amounted to 14.6 g. with an iodine value of 8.4.

*Example VII*

Chocolate was made according to the following formulas:

A 182 g. of cocoa mass
180 g. of sugar
38 g. of substitute; iodine value 31.9, dilatation at 20° C. 1950; percentage of substitute of the fat in the chocolate 27

B 112 g. of cocoa powder with 11% of fat
225 g. of sugar
87 g. of substitute, as in A
75 g. of cocoa butter; percentage of substitute of the fat in the chocolate 50

C 112 g. of cocoa powder with 11% of fat
225 g. of sugar
163 g. of substitute, as in A; percentage of substitute of the fat in the chocolate 93

The ingredients were thoroughly mixed at 60° C. in a mortar. The mixture was cooled, with constant stirring, until it was almost solid and the paste was subsequently placed for 1 hour in a stove 32° C. The chocolate mix was then poured into moulds and placed for 2 hours at 11° C in a refrigerator. After being stored for 2 days at room temperature, the chocolate was judged for fracture, appearance, and melting characteristics in the mouth. In all three cases the fracture, the appearance, and the melting characteristics in the mouth were satisfactory.

What I claim is:

1. A process for the preparation of a cocoa butter substitute, comprising the steps of, subjecting a fat in solid to semi-solid form suitable for extraction to at least one low-temperature extraction at a temperature between about —5 and about +10° C. with a total quantity of acetone of twice to twenty times as great as said fat to provide a first fat fraction as residue; and subjecting said residue to at least one subsequent extraction at a temperature between about 10 and about 35° C. with a total quantity of acetone of as great to fifteen times as great as the quantity of said fat, resulting in an extract containing said cocoa butter substitute.

2. A process according to claim 1, characterized in that each of at least one of the extractions is conducted in a series of stages wherein the extract of a succeeding stage of said series is used as the extracting liquid for a preceding stage of the same series.

3. A process according to claim 1, characterized in that said fat in solid to semi-solid form suitable for extraction is obtained by cooling a fat in the presence of acetone.

4. A process according to claim 1, characterized in that said fat in solid to semi-solid form suitable for extraction is obtained by cooling a fat in the presence of an extract from previous low temperature extraction in accordance with the process of claim 1.

5. A process according to claim 1, characterized in that said extractions are conducted continuously.

6. A process according to claim 2, characterized in that said extractions are conducted continuously.

7. A process according to claim 1 wherein said fat is palm oil.

8. A cocoa butter substitute obtained by the process claimed in claim 7.

9. A process according to claim 1, characterized in that said fat in solid to semi-solid form suitable for extraction is obtained by cooling a fat.

10. A process according to claim 1, characterized in that said fat in solid to semi-solid form suitable for extraction is obtained by cooling and crystallizing a fat.

References Cited in the file of this patent

UNITED STATES PATENTS 2,903,363    Farr _____ Sept. 8, 1959

FOREIGN PATENTS 217,590    Australia _____ May 2, 1957
589,947    Canada _____ Dec. 29, 1959

OTHER REFERENCES

"Cocoa Butter-Like Fats From Domestic Oils," by Feuge et al. The Journal of the American Oil Chemists' Society, May 1958, vol. XXXV, No. 5, pp. 194–199.

"Industrial Oil and Fat Products," Second Edition, by Bailey, Interscience Publishers, Inc., New York, 1951, pp. 138–142.